(12) United States Patent
Bjornholt et al.

(10) Patent No.: US 6,646,620 B1
(45) Date of Patent: Nov. 11, 2003

(54) ANTENNA SCANNER

(75) Inventors: John E. Bjornholt, Fountain Hills, AZ (US); Doug W. Taylor, Tempe, AZ (US)

(73) Assignee: Yazaki North America, Inc., Canton, MI (US)

( * ) Notice: Subject to any disclaimer, the term of this patent is extended or adjusted under 35 U.S.C. 154(b) by 22 days.

(21) Appl. No.: 09/928,758

(22) Filed: Aug. 13, 2001

(51) Int. Cl.[7] ................................................. H01Q 3/02
(52) U.S. Cl. ......................... 343/882; 343/766; 343/762
(58) Field of Search ................................. 343/757, 762, 343/763, 766, 767, 770, 878, 882; 342/70

(56) References Cited

U.S. PATENT DOCUMENTS

| | | | | |
|---|---|---|---|---|
| 5,979,586 A | * | 11/1999 | Farmer et al. ............... | 180/274 |
| 5,999,092 A | * | 12/1999 | Smith et al. ................. | 340/436 |
| 6,034,642 A | * | 3/2000 | Kojima et al. ............... | 343/753 |
| 6,094,158 A | * | 7/2000 | Williams ...................... | 342/70 |
| 6,275,180 B1 | * | 8/2001 | Dean et al. .................... | 342/70 |
| 6,278,360 B1 | * | 8/2001 | Yanagi ......................... | 340/436 |
| 6,411,250 B1 | * | 6/2002 | Oswald et al. ................ | 342/70 |
| 2002/0011958 A1 | * | 1/2002 | Ogawa et al. ............... | 343/761 |

\* cited by examiner

*Primary Examiner*—Don Wong
*Assistant Examiner*—Shih-Chao Chen
(74) *Attorney, Agent, or Firm*—Rader, Fishman & Grauer PLLC

(57) ABSTRACT

A wave guide scanner assembly having an oscillating support for a scanning antenna which is driven by an assembly having no contacting components. The scanner assembly is particularly useful for motor vehicular collision warning systems. The drive assembly for the oscillating support includes a coil and magnet for driving the support when current is applied thereby resulting in translational movement of the magnet and oscillating movement of the support. A spring flexure assembly is connected to the support for providing controlled harmonic oscillation to the support and antenna.

15 Claims, 4 Drawing Sheets

ANTENNA SCANNER

BACKGROUND OF THE INVENTION

This invention relates to an improved wave antenna scanner for a radar apparatus and, more particularly, to a compact design that is formed with a minimum number of components.

The present construction is directed towards a motor vehicular collision warning system which includes a scanned beam sensor, a signal processor, and a vehicle interface system that initiates warnings to the driver or adaptively controls the vehicle. In this forward looking collision warning system, the sensor is designed to project a narrow beam of energy toward objects in the forward field of view. A forward collision warning control of this type for a vehicle can require a unit life in excess of two hundred million cycles at temperatures ranging from −40° to 100° C. Thus, reliability requirements are high and unit costs must be low.

Conventional radar apparatus have included wave guide antenna for transmission and reception of radar signals. A conventional rotary drive is commonly used to rotate the antenna scanner. Since known wave antenna scanners use electric motors, they must be brushless to operate for the number of cycles to meet life rating specifications. These electric motors are, therefore, expensive and require a complex commutation scheme and sophisticated control electronics. Further, the electronic noise produced by switching and commutation can adversely affect the sensor and signal processing for the radar apparatus.

Another problem inherent with existing motors for use with wave antenna scanners relates to the gear reducer that is often required to provide slow speed operation. Scanning mechanisms which are composed of motors and bearings with gears or the like are inherently short lived due to the large number of moving parts and the need for lubrication. There are also problems associated with noise as a result of the wear on the parts after repeated cycling. Finally, conventional electric motors add waste heat within the system package that exacerbates the problem of cooling the sealed electronic package near the engine of the automobile.

Therefore, it is an object of the present invention to avoid the aforementioned disadvantages and problems associated with existing wave antenna scanners.

SUMMARY OF THE INVENTION

In accordance with this invention, a radar apparatus is provided with a rotatable antenna structure such as a slotted wave guide antenna. The antenna is driven to oscillate back and forth at an angle of 12° or less in each direction. A transceiver is coupled to the antenna and the antenna passes transmitted and reflected radar signals to and from a target as it is oscillated back and forth. The scanned signals are directed to a processor and then to a vehicle interface system for initiating warnings to the driver or adaptively controlling the vehicle.

The rotatable antenna is mounted to a tuned mass and spring scanner assembly which is designed to produce a controlled harmonic oscillation at a specific resonance frequency when excited by a chain of timed electrical impulses. The impulse timing, duration and amplitude are based upon feedback provided by a position sensor on the scanner.

The scanner is an electromechanical mechanism consisting of a moving support with one end mounted by way of a spring flexure device to a stationary chassis and the other end mounting the scanning antenna. The drive for the moving support is magnetic and has no contacting components. The moving support is connected to the stationary chassis by the spring flexure device. The moving support and spring assembly use the spring as an energy reservoir thereby taking advantage of its natural resonance for providing a tuned mechanism. A coil and magnet drive the moving support such that there is no electrical wiring or signals transferred from the moving support to the stationary chassis. Further, there are no bearings and no sliding or fretting thereby preventing any Coulomb friction. Moreover, the assembly is shock tolerant since the spring flexure device has a high axial spring rate to provide robustness and a controlled radial spring rate for providing harmonic oscillation.

The scanner position sensor is used for closed loop control to maintain the proper scan angle and also provide position information to the signal processor. Electronic control is provided by a microprocessor. The resonant nature of the scanner drive allows low power consumption. The resulting assembly is capable of predictable and efficient oscillatory motion. Further, since the assembly is unencumbered by friction, its life is controlled by the durability of the drive electronics and the fatigue characteristics of the spring device.

The foregoing and other advantages and features of the invention will be more apparent from the following description when taken in connection with the accompanying drawings.

DETAILED DESCRIPTION OF A PREFERRED EMBODIMENT

Figure 1:
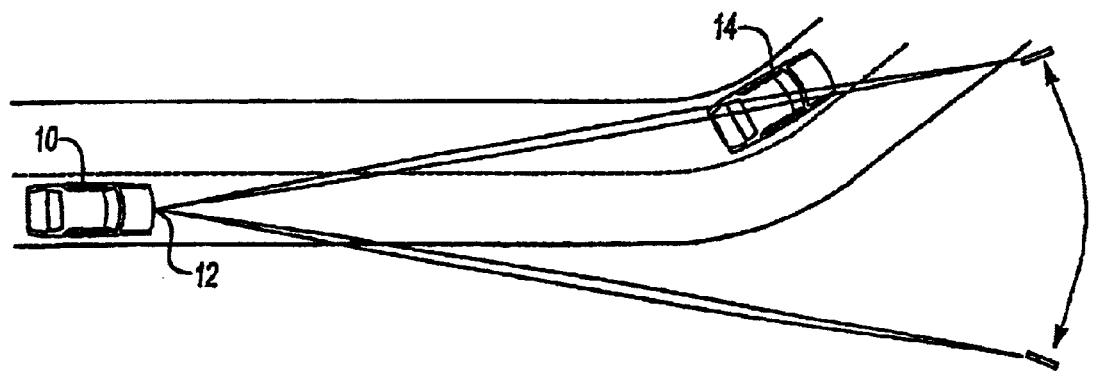
FIG. 1 is an illustration of one embodiment of an environment wherein the present invention may be used.

FIG. 1 illustrates one embodiment of an environment in which the present invention is useful. A traveling vehicle 10 has a vehicular collision warning system 12 mounted at a front portion of the vehicle body. The collision warning system emits a forward signal, such as a radar wave, from the vehicle and also receives a reflected wave from an obstacle, such as another vehicle 14, which is driving towards or away from vehicle 10. The collision warning system measures the distance between the traveling vehicle 10 and the other vehicle 14. If the system detects an object directly in front of the traveling vehicle, it automatically activates an alarm or adaptively controls the vehicle by, for example, activating a brake to supply a braking force to the vehicle's wheels.

Thus, the vehicular collision warning system notifies the driver of an impending collision or initiates evasive action to avoid a collision or actively adjusts the vehicle speed to maintain a time headway to the closest in path object. Warnings may be visual, auditory, or tactile and the vehicle control actions may include braking, throttle control, transmission control and evasive steering.

Figure 2:
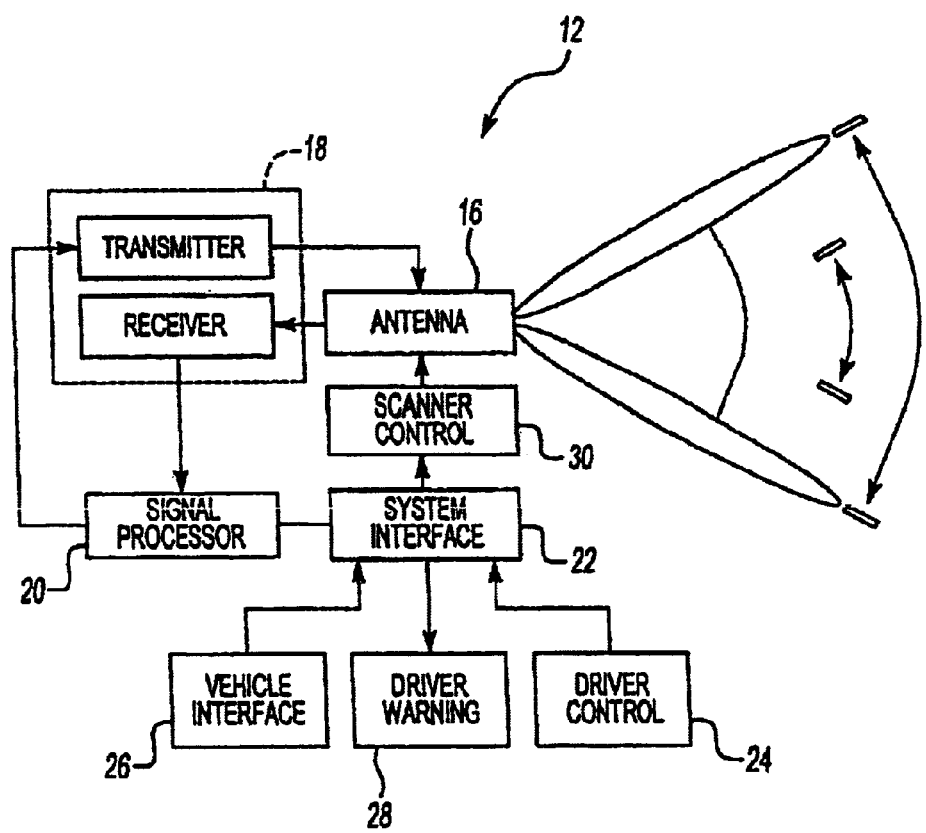
FIG. 2 is a schematic block diagram of a vehicular collision warning system which includes the present invention.

Referring now to FIG. 2, the forward looking collision warning system 12 of the present invention is provided with a rotatable antenna structure 16 which may be in the form of a slotted wave guide antenna. The antenna 16 is driven to oscillate back and forth at an angle of 12° or less in each direction. A transceiver 18 is coupled to the antenna and the antenna passes transmitted and reflected radar signals to and from a target as it is oscillated back and forth. The scanned signals are directed to a processor 20 and then to a system interface 22 which receives input from a driver control 24 and a vehicle interface 26. The outputs from the system interface 22 are directed to a driver warning or adaptive control 28 as well as to the scanner control 30.

Figure 3:
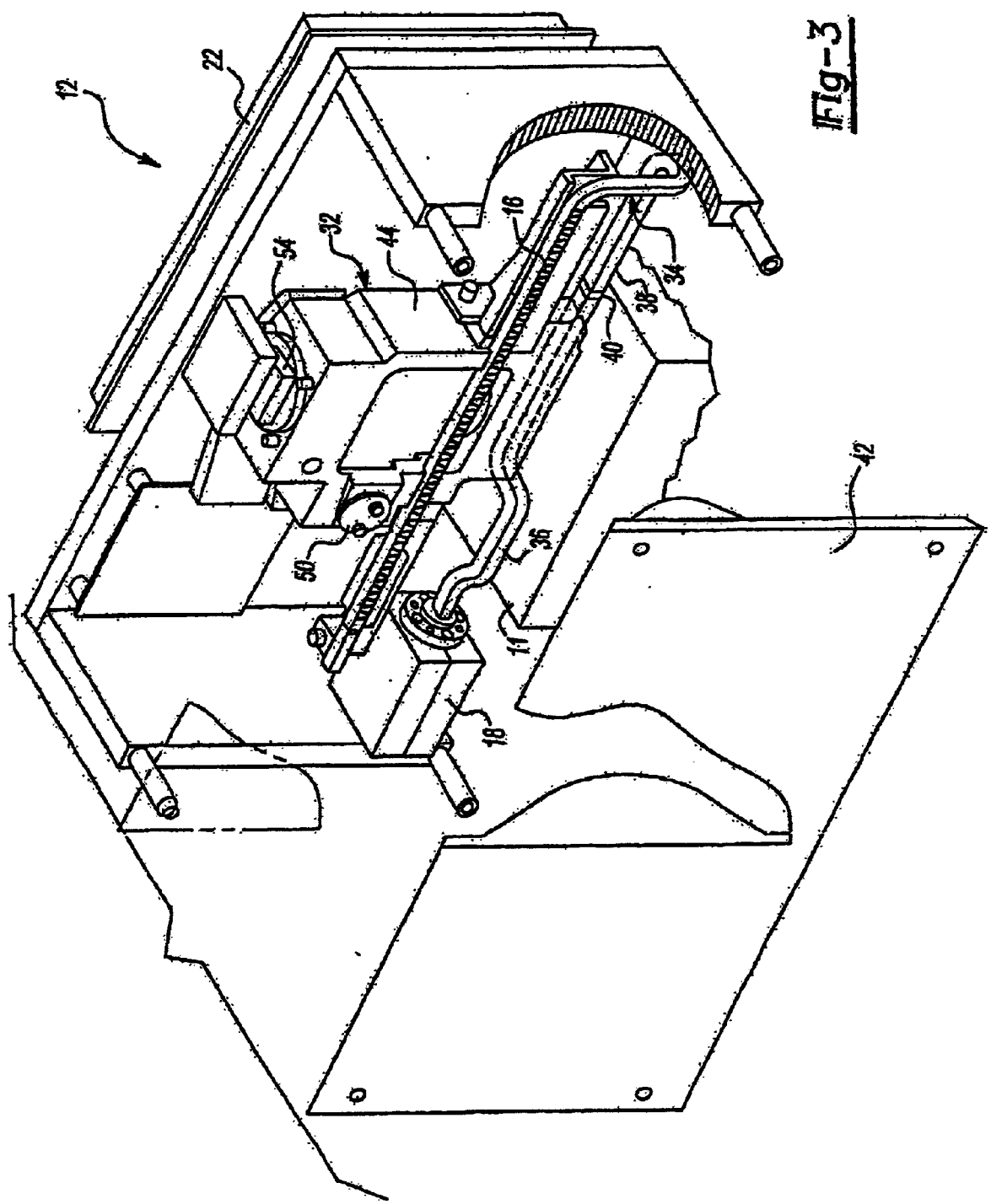
FIG. 3 is a perspective view of one embodiment of a vehicular collision warning system incorporating the teachings of the present invention.

The motor vehicular collision warning system 12 is shown in more detail in FIG. 3. It includes the transceiver 18, an antenna scanner assembly 32, and a rotatable wave guide assembly 34. As will be described in more detail, an antenna portion 16 of the wave guide assembly 34 is driven to oscillate back and forth at an angle of 12° or less in each direction. The transceiver 18 is coupled to the wave guide feed portion 36, and the wave guide assembly passes transmitted and reflected radar signals to and from a target as it is oscillated back and forth. The scanned signals are then directed to the processor 20 and then to a system interface 22 for initiating warnings to the driver or adaptively controlling the vehicle.

The wave guide antenna 16 is rectangular in cross section and includes a center feed with a plurality of slotted apertures to pass transmitted and reflected radar signals to and from a target. The angles of inclination of the slots are reversed with successive slots in order to reverse the face of the energy coupled with the slot. The slots are separated by predetermined and calculated distance to give a desired radiation pattern relative to the phase velocity in the wave guide and its expected variations.

Another portion 38 of the wave guide is integrally formed with the antenna 16. Wave guide portions 36 and 38 are separated from each other by an air gap 40. The wave guide antenna 16 is mounted to the rotatable scanner assembly 32 such that it may be oscillated back and forth at an angle of 12° or less in each direction. The small air gap 40 allows relative angular movement between the wave guide antenna 16 and the fixed wave guide portion 36.

Figure 5:
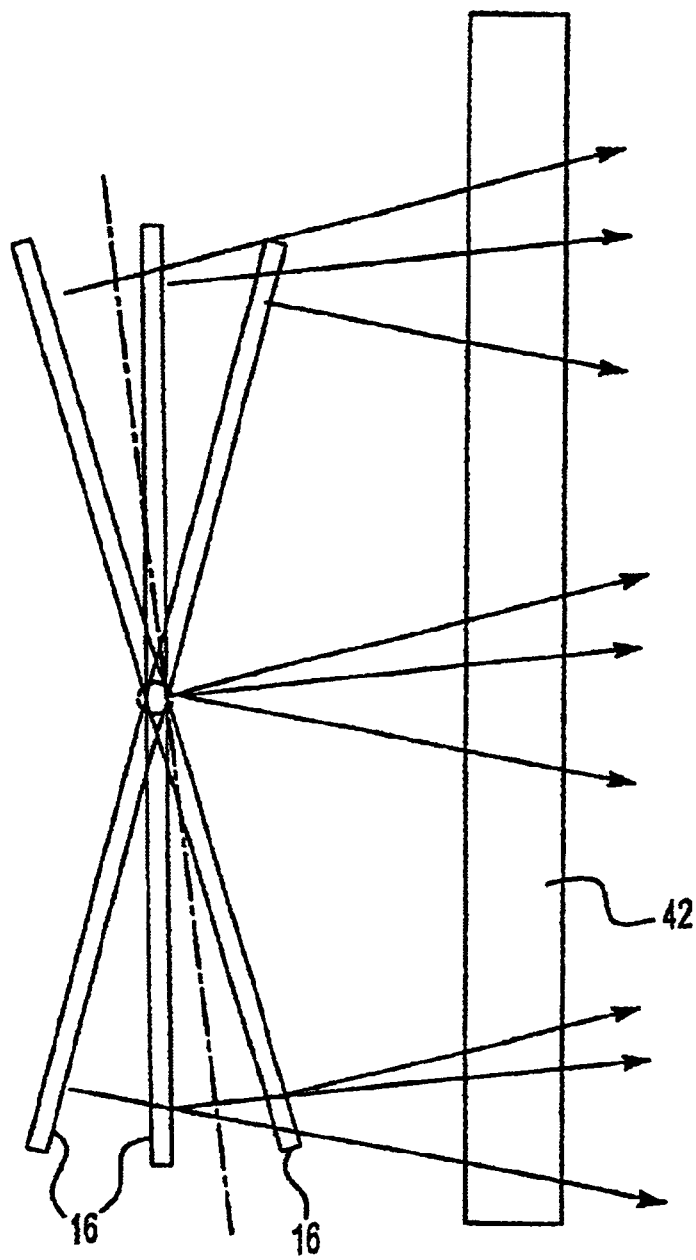
FIG. 5 is a schematic illustration of a rotatable antenna for the radar apparatus wherein the antenna is driven to oscillate for emitting and receiving radar waves.

FIG. 5 schematically illustrates the oscillation of antenna 16. As shown, antenna 16 passes transmitted and reflected radar signals through its slotted apertures to and from a target as it is oscillated back and forth. The signals are passed through a lens 42 which is positioned in front of the oscillating antenna 16. As described previously, the scanned signals are directed to a processor and then to a vehicle interface system for initiating warnings to the driver or adaptively controlling the vehicle.

Figure 4:
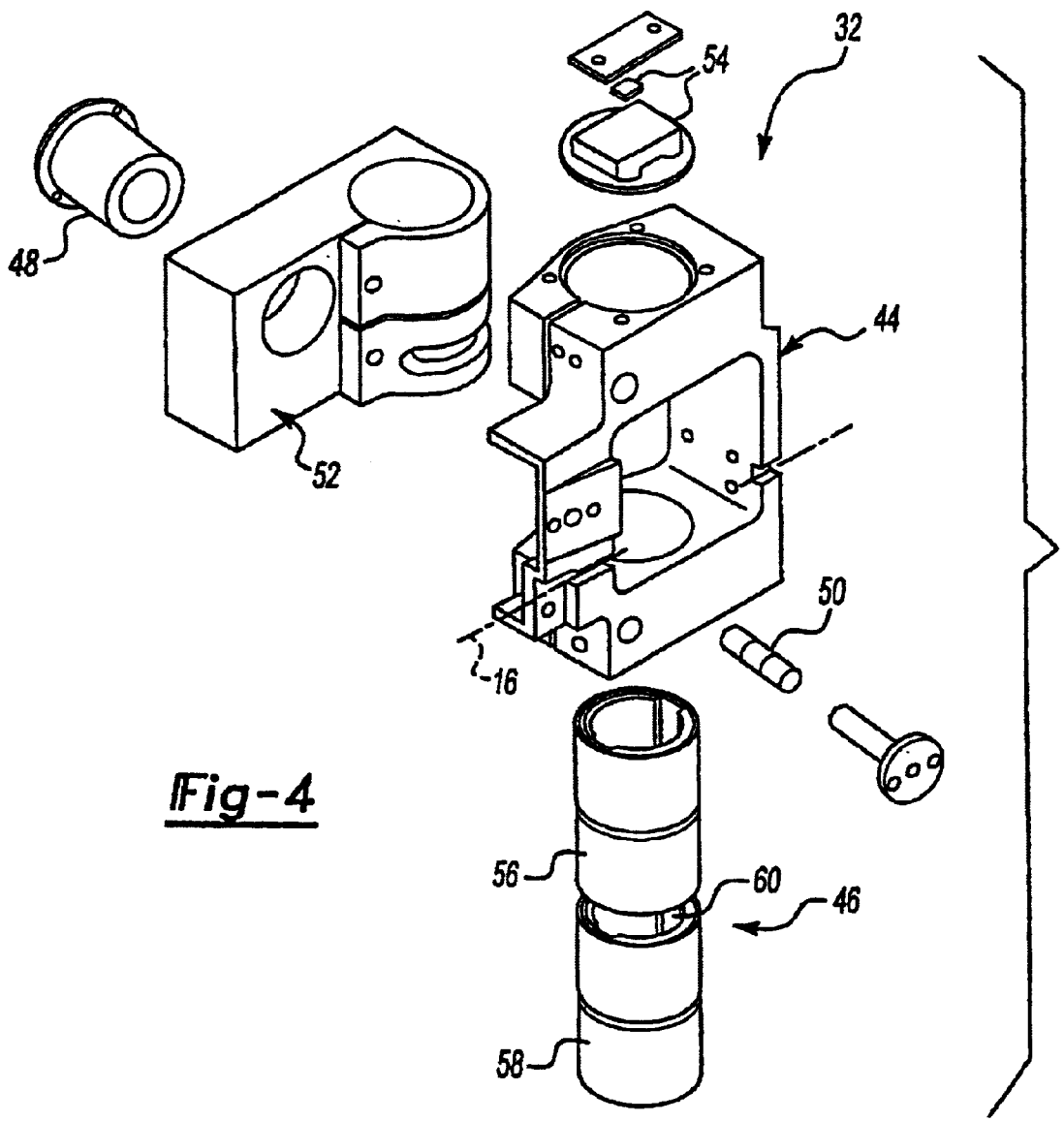
FIG. 4 is a perspective view of the principal components of the wave antenna scanner of the present invention.

Referring now to FIG. 4, the wave guide scanner assembly 32 is an electromechanical mechanism consisting of a moving support 44 with one end mounted by way of a spring flexure device 46 to a stationary chassis 11 (see FIG. 3) and another portion mounting the scanning antenna 16. The drive assembly for the moving support is magnetic and has no contacting components. A coil 48 and magnet 50 drive the moving support 44 when positive and negative DC current is applied to the coil which results in translational movement of the magnet 50 and oscillating movement of the moving support 44. The coil 48 is mounted to a fixed support 52 while the thrust magnet 50 is mounted to the moving support 44. Since the moving support is connected to the spring flexure assembly 46, the moving support 44 uses the spring assembly as an energy reservoir thereby taking advantage of its natural resonance for providing a tuned mechanism.

The spring flexure assembly 46 is illustrated as including two cylindrically shaped flexure portions 56 and 58 which are interconnected by longitudinal spring leaves 60. One of the flexure portions 58 is fixed while the other flexure portion 56 is connected to the moving support 44. As the thrust magnet 50 is translationally moved within coil 48, support 44 is oscillated thereby oscillating attached antenna 16. The construction of spring flexure device 46 is such that there is a high axial spring rate between flexure portions 56 and 58 and a weaker radial spring rate for the flexure portions thereby allowing harmonic oscillation for the moving support 44.

The tuned mass and spring scanner assembly 32 produces a controlled harmonic oscillation at a specific resonance frequency when excited by a chain of timed electrical impulses. The impulse timing, duration and amplitude are based upon feedback provided by a position sensor 54 on the scanner. The coil 48 and magnet 50 drive the moving support 44 such that there is no electrical wiring or signals transferred from the moving support 44 to the stationary chassis. Further, there are no bearings and no sliding or fretting thereby preventing any Coulomb friction. Moreover, the scanner assembly 32 is shock tolerant since the spring flexure assembly 46 has a high axial spring rate to provide robustness and a controlled radial spring rate for providing harmonic oscillation.

It is to be understood that the above-described embodiment is merely illustrative of one embodiment of the principles of the present invention. Other embodiments can be devised by those skilled in the art without departing from the scope of the invention.

What is claimed is:

1. A sensing system comprising:

(a) an antenna scanner assembly including a moving support rotatably mounted to a chassis and also mounted to a scanning antenna;

(b) a drive assembly for oscillating said moving support; and (c) a transceiver coupled to said scanning antenna for transmitting radar signals to a target as said scanning antenna is oscillated, wherein said drive assembly for said moving support has no components in contact with said moving support.

2. The sensing system of claim 1 wherein the drive assembly for the moving support is magnetic.

3. The sensing system of claim 2 wherein the drive assembly includes a coil and magnet for driving the moving support when current is applied to the coil thereby resulting in translational movement of the magnet and oscillating movement of the moving support.

4. The sensing system of claim 3 wherein said coil is mounted to a fixed support while the magnet is mounted to the moving support.

5. The sensing system of claim 1 wherein the moving support is mounted by a flexure device to the chassis.

6. The sensing system of claim 5 wherein the flexure device has an axial spring rate substantially greater than its radial spring rate thereby allowing harmonic oscillation for the moving support.

7. The sensing system of claim 6 wherein the flexure device includes at least two cylindrically shaped portions and wherein one of the flexure portions is fixed while the other flexure portion is connected to the moving support.

8. The sensing system of claim 1 wherein the antenna is a slotted wave guide that is oscillated at an angle of 12° or less in each direction.

9. The sensing system of claim 8 wherein a first portion of a wave guide feed is integral with the antenna, a second portion of the wave guide feed is connected to the transceiver, and the wave guide feed portions are separated from each other by an air gap.

10. A wave guide scanner assembly including a moving support rotatably mounted to a stationary chassis, a scanning antenna connected to said moving support, and a drive having no components in contact with said moving support for providing oscillating movement of the moving support and antenna.

11. The wave guide scanner assembly of claim 10 wherein the drive for the moving support is an electromechanical device.

12. The wave guide scanner assembly of claim 11 wherein the drive includes a coil mounted to a fixed support and a magnet mounted to the moving support and wherein current applied to the coil results in translational movement of the magnet and oscillation movement of the moving support.

13. The wave guide scanner assembly of claim 10 wherein a flexure device rotatably mounts said moving support.

14. The wave guide scanner assembly of claim 13 wherein the flexure device includes at least two flexure portions with one of the flexure portions being fixed while the other flexure portion is connected to the moving support.

15. A wave guide scanner assembly including an oscillating support for an antenna and a drive assembly for the support, the drive assembly having no components in contact with the oscillating support.

* * * * *